United States Patent Office 3,105,574
Patented Oct. 1, 1963

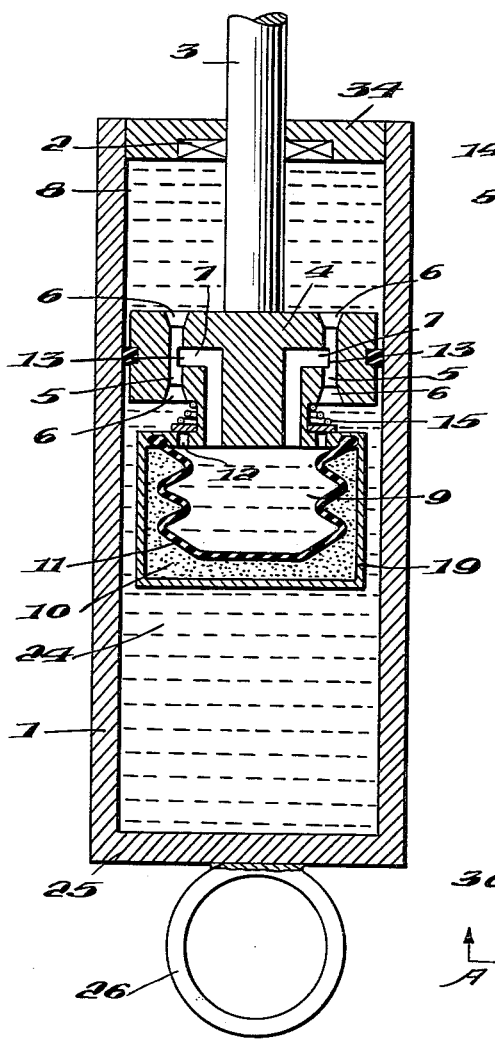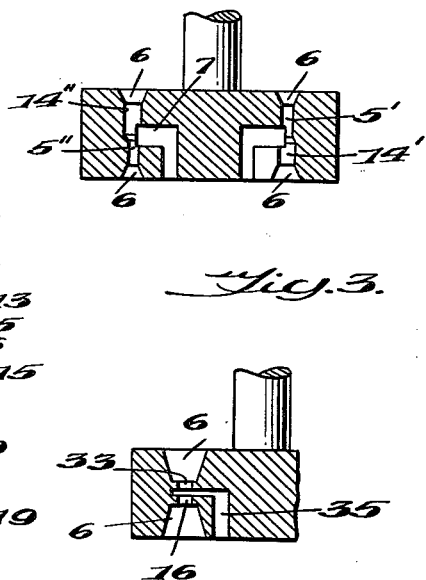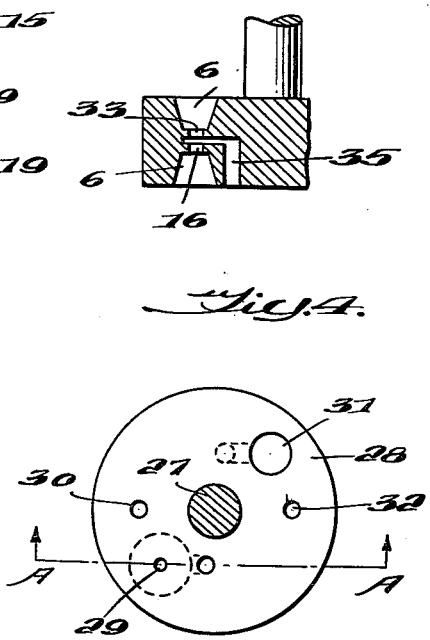

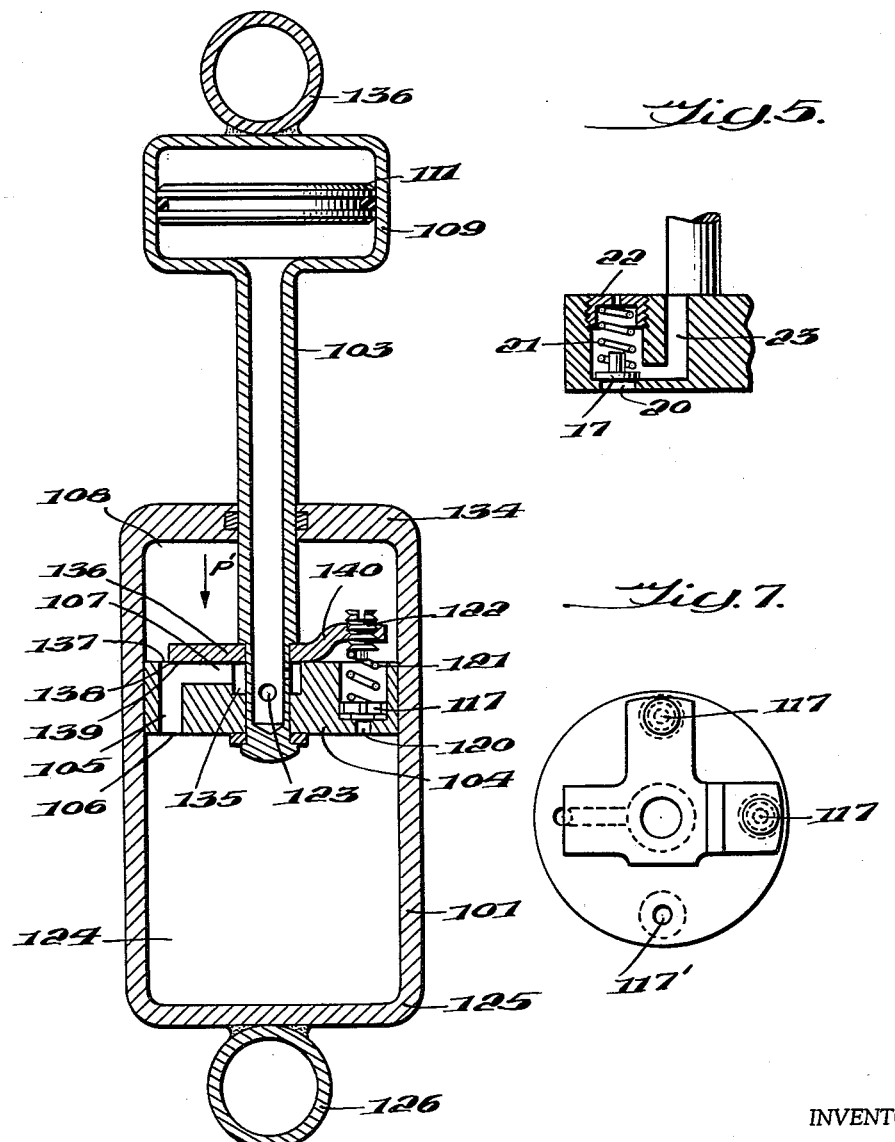

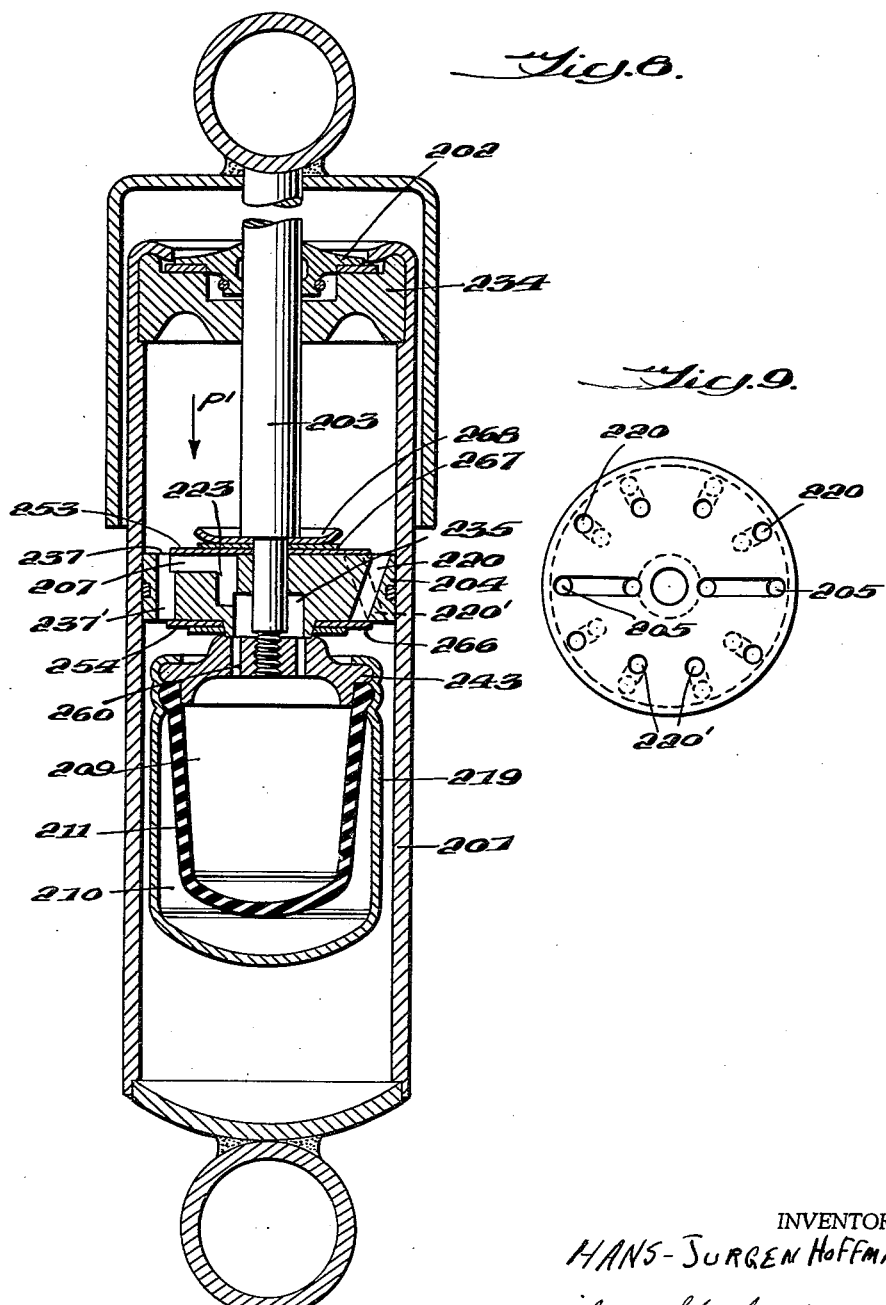

3,105,574
HYDRAULIC SHOCK ABSORBER FOR VEHICLES
Hans-Jürgen Hoffmann and Günter Frenzel, both of Eitorf (Sieg), Germany, assignors to Boge G.m.b.H., a company of Germany
Filed May 31, 1961, Ser. No. 113,702
Claims priority, application Germany July 9, 1960
15 Claims. (Cl. 188—88)

The present invention relates to a telescopic vibration damper or shock absorber, especially for motor vehicles, of the type in which a piston on the end of a piston rod divides an oil-filled cylinder into an outer work chamber facing toward the piston rod and an inner work chamber axially opposite thereto. The two work chambers communicate with each other through throttling bores in the piston and they also communicate with an elastically compressible compensating chamber for receiving the damping oil which is expelled from the cylinder when the piston rod passes into it and when the oil expands through an increase in temperature. The piston is capable of moving within the cylinder since at each movement in one direction it forces the damping oil through its throttling bores in the opposite direction from one work chamber to the other and thereby produces an increased pressure in the particular work chamber toward which it moves. The damping oil which is thus placed under pressure then acts upon the inner surfaces of the cylinder defining the particular work chamber and upon the face of the piston, whereby the damping force will be transmitted to the piston and piston rod. As already stated, the damping oil also communicates with the elastically yielding compensating chamber.

It is an object of the present invention to provide a vibration damper or shock absorber of the above-mentioned type in which the connecting passage between the damping oil in the cylinder and the compensating chamber is designed in a very simple manner so as to prevent the increased pressure of the damping oil which is produced by the movement of the piston rod into one of the work chambers of the cylinder from being transmitted to the compensating chamber, the elastic material of which is more sensitive to such pressure than the solid material of the piston and cylinder.

For attaining this object the invention provides at least one of the throttling bores between the opposite end surfaces of the piston with a nozzlelike constriction, and it further provides the connecting channel leading to the elastic compensating chamber in a position so that its inlet opening will be disposed substantially at this nozzlelike constriction.

The point of connection of the channel leading to the compensating chamber is therefore located within an area in which according to the Bernoulli law a reduced pressure exists during the operation of the damping piston. Thus, the high pressure within the work chamber of the cylinder will according to the invention be prevented from reaching the elastic compensating chamber, even though no check valves or similar means are provided.

Insofar as thermal conditions are concerned, the shock absorber according to the invention has the further advantage over other one-tube designs in which the air-filled compensating chamber is provided at the upper or lower end of the cylinder and reduces the oil-covered area thereof that the inner surface of the cylinder is always in contact with the oil along its entire length. Thus, there is an adequate heat transmission at all points, and since the oil which participates at every stroke in the transmission of energy must also pass through the annular chamber between the inner surface of the cylinder and the outer surface of the cup-shaped compensating chamber, the heat transfer to the cylinder aided by the increased speed of the oil flow, is also very good within this area. Since the oil and air are separated in the compensating chamber in the usual manner by a movable partition, the shock absorber is not dependent upon any particular mounting position.

The above-mentioned as well as other objects, features, and advantages of the present invention will become more clearly apparent from the following detailed description thereof, particularly when the same is read with reference to the accompanying drawings, in which:

FIGURE 1 shows an axial section of a first embodiment of the vibration damper or shock absorber according to the invention which is provided with a compensating chamber on the end of the piston;

FIGURES 2 and 3 show detail views of two different modifications of the throttling channels according to FIGURE 1;

FIGURE 4 shows an end view of the damping piston which is provided with two throttling channels and two pressure-control valves;

FIGURE 5 shows a cross section taken along line A—B of FIGURE 4;

FIGURE 6 shows an axial section of a modified shock absorber according to the invention, in which the piston rod is hollow and its outer end is enlarged to form the compensating chamber;

FIGURE 7 shows an end view of the piston according to FIGURE 6, as seen in the direction of the arrow P therein;

FIGURE 8 shows an axial section of a further modification of the shock absorber according to the invention which is provided with a compensating chamber on the end of the piston; while FIGURE 9 shows an end view of the piston according to FIGURE 8, as seen in the direction of the arrow P' therein.

Referring to the drawings, and first particularly to FIGURE 1, cylinder 1 of the vibration damper or shock absorber according to the invention is divided by a piston 4 on the end of a piston rod 3 into an outer work chamber 8 and an inner work chamber 24. The inner work chamber 24 is closed by a bottom 25 which carries a mounting eye 26, while the outer work chamber 8 is closed by a cover 34 with a central aperture therein through which piston rod 3 extends and which is tightly sealed toward the outside by a gasket 2. The peripheral wall of piston 4 is provided with a gasket or piston ring 18 which engages with the inner wall of cylinder 1 and tightly seals the two work chambers 8 and 24 from each other.

When piston 4 moves in its compressing direction, that is, downwardly as viewed in FIGURE 1, the oil contained in the cylinder flows from the inner work chamber 24 into the outer work chamber 8 through the throttling bores 5 which are provided with outwardly tapering funnellike ends 6. The oil volume which corresponds to the volume of the entering piston rod 3 and which cannot be taken up by the outer work chamber 8 passes from the throttling channels 5 through channels 7 into the oil-filled compensating chamber 9 which is formed within a cylindrical container 19 by an elastic bellows 11 which separates the compensating chamber 9 from an air chamber 10. At the resulting expansion of bellows 11, the air in chamber 10 will be compressed.

The entry of the oil from throttling bores 5 into channels 7 occurs at a point at which the velocity of the flow of the oil is very high and the flow pressure is accordingly low. This insures that the flow pressure cannot be released quickly and directly into the compensating chamber 9, but that the oil flow must always fill out the work chamber 8 completely and that only that amount of oil can flow into the compensating chamber which exceeds the volume of work chamber 8.

When piston 4 moves in the opposite or expanding direction, that is, upwardly as viewed in FIGURE 1, the throttling bores 5 with their funnellike ends 6 produce the same effect as mentioned above insofar as due to the high velocity of flow in the nozzlelike throttling bores the amount of oil corresponding to the volume of the retreating piston rod is drawn from compensating chamber 9 through channels 7 into the inner work chamber 24. The outward flow of the oil from compensating chamber 9 may be accelerated by the provision of at least one additional outlet 12 which will be closed by a spring-loaded check valve 15 when the flow occurs in the opposite direction.

By modifying the shape of the throttling bores 5 and the course of flow therethrough, it is possible to vary their suction and throttling effect so as to differ in the compression and expansion direction of the shock absorber. Thus, for example, as shown in FIGURE 2, the throttling bore 5' at the right side terminates in the downward direction into a larger bore 14', while the throttling bore 5" at the left side terminates in the upward direction into a larger bore 14". Channels 7' branch off from a part of the circumference of the throttling bores similarly as in FIGURE 1. According to FIGURE 3, the throttling bore 33 is provided along its entire peripheral wall with an annular channel 16 of a low height which communicates with channel 35 leading to the compensating chamber. Thus, a very high underpressure will be produced in the annular channel 16 and the suction effect through which the oil will be drawn during the expansion stage from compensating chamber 9 will become so strong that the spring-loaded check valve 15 will no longer be necessary.

FIGURE 4 shows the arrangement of a pair of throttling bores 30 and 32 and a pair of pressure-control valves 29 and 31 in piston 28. According to FIGURE 5, each pressure control valve consists of a valve disk 17 which is acted upon by a spring 21 to close the opening 20. Spring 21 may be adjustable by a screw 22. When valve disk 17 is opened, the oil will flow to the opposite work chamber through a wide passage which is formed by opening 20 and one or more connecting channels 23. One or more of such valves may be provided for each direction of flow.

In the embodiments of the shock absorber according to FIGURES 6 and 7, and 8 and 9, respectively, the nozzlelike constriction of the throttling channel in the piston is formed by the edge of a separate disk, and the connection to the compensating chamber by the disk itself, so that the throttling bores may be easily produced.

According to FIGURES 6 and 7, piston rod 103 is made hollow and carries on its outer end a mounting eye 36. This outer end is enlarged and forms the compensating chamber 109 which is filled partly with oil and partly with air and contains a piston 111 which is slidable in chamber 109 and separates the oil and air cushions from each other. The inner end of piston rod 103 again carries the damping piston 104 which is slidable within the cylinder 101 which is closed by a cover 134 and a bottom 125, the latter carrying a mounting eye 126. The throttling channel 105 communicates with the inside of the hollow piston rod 103 through a recess 107, an annular groove 135, and radial bores 123. The open upper end end of groove 135, recess 107, and throttling bore 105 are covered by a disk 136 so as to leave a reduced opening 137 forming the constriction of the throttling channel. Thus, when the piston moves in the expanding direction, an area of a higher velocity of flow and a lower pressure will be formed behind the edge 138 of disk 136, whereby the oil will be drawn from compensating chamber 109.

When piston 104 moves inwardly, the oil flowing toward compensating chamber 109 passes into the opening 106 of throttling bore 105 at the lower side of the piston. The passage of the oil current into the piston rod will be aided by its impact against the lower side 139 of disk 136, whereby the oil will be deflected radially inwardly toward the piston rod. Disk 136 has an offset portion 140 which serves as an abutment for supporting a valve spring 121 which is adjustable by a setscrew 122 and acts upon valve 117 which controls the valve opening 120.

At a slow movement of the piston, the oil flows from the inner work chamber 124 to the outer work chamber 108 or vice versa only through the throttling bore 105. At a higher speed of movement of the piston, an additional flow occurs during the compression or expansion strokes of the shock absorber through valves 117 or 117', respectively.

According to the further embodiment of the invention, as shown in FIGURES 8 and 9, the valve disk of a disk valve which is provided on the damping piston for influencing the throttling characteristic is also utilized for producing the required constriction of the throttling bore. The compensating chamber is formed by the container 219 and its cover 243 which also secures piston 204 to the piston rod 203. Cylinder 201 is closed at its upper end by a cover 234 which contains a suitable gasket 202 for piston rod 203. For producing the vibration damping forces at slow piston movements, the oil flow occurs solely through the throttling bore 205, while for producing the damping forces at higher piston speeds, the flow occurs through bores 220 and 220' which are covered by the series of spring disks 253. Throttling bore 205 communicates through the recess 207, bore 223, the annular chamber 235, and bores 260 in the cover 243 with oil chamber 209 in container 219 which is separated from the air chamber 210 by a diaphragm 211. The opening 237 of throttling bore 205 for the entry of the flow of oil from the outer to the inner work chamber is partly covered by spring disks 253. The constant flow of oil through the piston is determined by the size of the openings 237 and 237' of throttling bore 205 which is left uncovered by spring disks 253 and 254, respectively, and the size of these openings may be easily varied by changing the diameter of the spring disks. It is advisable to cover the throttling bore 205 at one or both sides of the piston only with one spring disk 266 of a larger diameter which is supported by one or more disks 267 of a smaller diameter. For limiting the movement of the spring disks a bracing disk 268 is provided. FIGURE 9 shows the front side of the damping piston which is provided with two throttling bores 205, and four bores 220' for the passage of the oil during the expansion movement and four bores 220 for the passage during the compression movement.

For the constant oil passage which determines the damping forces at slow piston movements, it is possible to provide the piston not only with the throttling bores as illustrated, but also with one or more bores or channels at other points. The position in which the shock absorber is to be mounted may differ from the position as illustrated if the diaphragms or pistons serving as partitions between the air and oil in the compensating container are employed. The compensating chamber may also be made of a foamy synthetic material. The air around the compensating chamber may also be maintained under increased pressure, in which event the shock absorber may be used, for example, as a compressed-air landing leg. The damping function of the shock absorber is, however, not dependent upon the pressure within the compensating chamber.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A telescopic shock absorber comprising a cylinder adapted to be filled with oil, and having an opening at one end, a piston slidable within said cylinder along the inner wall thereof and dividing said cylinder into a pair of work chambers, a piston rod connected to said piston and slidably extending through said opening, at least one throttling bore of varying cross-sectional area extending through said piston and connecting said work chambers for passing the oil at a high velocity from one work chamber to the other upon a movement of said piston in said cylinder, an elastic compensating chamber adapted to receive the oil expelled from said cylinder by the movement of said piston rod therein and by the thermal expansion of the oil, within said cylinder, and a conduit within the piston branching off from a point of said throttling bore at which the pressure is reduced to a pressure lower than that in other parts of the bore by virtue of the reduced cross-sectional area, said conduit connecting said throttling bore with said compensating chamber.

2. A telescopic shock absorber as defined in claim 1, in which said portion of reduced cross-sectional area comprises a nozzlelike constricted portion, said conduit branching off said throttling bore adjacent said constricted portion.

3. A telescopic shock absorber as defined in claim 1, in which said portion of reduced cross-sectional area comprises a nozzlelike constricted portion, and said bore including a portion of a larger cross-sectional area extending from said constricted portion in the direction of the oil flow, said conduit branching off said throttling bore adjacent the point of connection of said constricted and larger bore portions.

4. A telescopic shock absorber as defined in claim 1, in which said throttling bore has a funnellike mouth on at least one end of said piston.

5. A telescopic shock absorber as defined in claim 1, in which the branch-off of said conduit merges with at least a part of the peripheral wall of said throttling bore.

6. A telescopic shock absorber as defined in claim 1, in which the peripheral wall of said throttling bore within said piston has therein an annular recess of low height around said throttling bore forming a part of said conduit.

7. A telescopic shock absorber as defined in claim 1, further comprising at least one pressure control valve within said piston and connecting said two work chambers and acting in the direction of flow of the oil from one of said work chambers to the other.

8. A telescopic shock absorber as defined in claim 1, in which said compensating chamber comprises a cup-shaped housing partly filled with oil and partly with a gas and having an outer diameter smaller than the inner diameter of said cylinder and mounted on the side of said piston opposite to the side carrying said piston rod.

9. A telescopic shock absorber as defined in claim 1, in which said compensating chamber comprises a container connected to said piston and having a movable partition therein dividing said container into a compartment filled with oil and another compartment filled with a gas.

10. A telescopic shock absorber as defined in claim 9, further comprising a check valve connecting said oil compartment with one of said work chambers.

11. A telescopic shock absorber as defined in claim 1, further comprising a disk mounted on the surface of said piston facing toward said piston rod and having an outer edge partly covering the end opening of said throttling bore so as to form said portion of reduced cross-sectional area, said piston having a recess in said surface underneath and also covered by said disk forming at least a part of said conduit connecting said end opening of said throttling bore with said compensating chamber.

12. A telescopic shock absorber as defined in claim 11, in which said disk comprises a spring plate engaging under tension with said piston surface.

13. A telescopic shock absorber as defined in claim 11, further comprising another disk mounted on the opposite surface of said piston and partly covering the other end opening of said throttling bore.

14. A telescopic shock absorber as defined in claim 11, in which said compensating chamber comprises a container having a cover secured to the side of said piston opposite to the side carrying said piston rod, said conduit further comprising an annular recess in said piston and substantially coaxial therewith and communicating with said surface recess, and said conduit further comprising bores extending through said cover and connecting said annular recess with the inside of said container.

15. A telescopic shock absorber as defined in claim 11, in which said piston rod is hollow and its inner end extends through and is secured to said piston, said compensating chamber being mounted on the outer end of said piston rod, said conduit further comprising an annular recess in said piston and substantially coaxial therewith, and said conduit further comprising radial bores in the wall portion of said piston rod within said piston and connecting said annular recess with the inside of said piston rod.

References Cited in the file of this patent

UNITED STATES PATENTS

| | | |
|---|---|---|
| 2,161,811 | Grebe | June 13, 1939 |
| 2,182,581 | Casper | Dec. 5, 1939 |
| 2,333,096 | Dowty | Nov. 2, 1943 |
| 2,357,278 | O'Connor | Aug. 29, 1944 |
| 2,695,079 | Brundrett | Nov. 23, 1954 |
| 2,819,064 | Peras | Jan. 7, 1958 |
| 2,867,298 | Roder | Jan. 3, 1959 |

FOREIGN PATENTS

| | | |
|---|---|---|
| 1,056,946 | Germany | May 6, 1959 |
| 1,093,667 | France | Nov. 24, 1954 |